3,006,718
METHOD OF TREATING EXHAUST VAPORS CONTAINING UNBURNED FUEL HYDROCARBONS
Wright Wesley Gary, Los Angeles, Calif., assignor to Minerals & Chemicals Philipp Corporation, a corporation of Maryland
No Drawing. Filed Oct. 16, 1959, Ser. No. 846,798
5 Claims. (Cl. 23—2)

The present invention relates to a novel system and method of treating exhaust vapors containing unburned fuel hydrocarbons, e.g., exhaust from an internal combustion engine or from smoke stacks of domestic or industrial burners.

In recent years the correlation between the presence of unburned fuel hydrocarbons in the atmosphere and the production of so-called "smog" conditions has been established with some certainty. Smog irritants, which are deleterious to health and comfort, are believed to be the result of a gaseous phase photo-chemical reaction in which unburned fuel hydrocarbons and nitrogen oxides in the atmosphere are prime contributory factors. The composition of exhaust from internal combustion engines and smoke stacks is generally characterized by the presence of unburned fuel hydrocarbons, both saturated and unsaturated, carbon monoxide and hydrogen. Partial oxidation products, such as organic acids, aldehydes and ketones may be present in some exhaust and typify material present in diesel exhaust. Normally exhaust from internal combustion engines and furnaces also contain finely divided unburned carbonaceous solids. The specific composition of exhaust vapors from the aforementioned sources varies, inter alia, with the fuel employed and the efficiency of combustion. For example, in the case of internal combustion engines, the exhaust composition will depend on engine type as well as engine load, speed, etc. The specific hydrocarbon components of exhaust which are responsible for smog conditions have not been ascertained with certainty.

Many efforts have been made in the past to eliminate noxious matter normally present in exhaust fumes, particularly exhaust from internal combustion engines. The most promising approach has involved the inclusion in a modified acoustic muffler of a zone (or plurality of zones) of exhaust-treating material so that raw exhaust comes in direct contact with and is purified by active exhaust-treating material at elevated temperature before the exhaust passes into the atmosphere. Efforts of this sort were primarily directed to the conversion of the carbon monoxide content of exhaust into innoxious carbon dioxide by catalytic oxidation. While this in itself was a noteworthy objective, many prior art workers failed to recognize that compounds in exhaust other than carbon monoxide were a potential menace.

The problem of purifying exhaust with any material, particularly exhaust from an automobile or the like, is a very difficult complex matter. The exhaust-treating muffler-type device is subjected in use to wide fluctuations in temperature over short periods of time. As a result, materials of construction and exhaust-treating substance employed in such devices are prone to failure due to thermal stress. Frequently engine exhaust reaches temperatures as high as 1500° F. or higher. At temperatures of this order many materials, such as precious metal-containing oxidation catalysts, tend to lose permanently their catalytic activity. Catalysts which promote oxidation of carbon monoxide are particularly liable to encounter extremely elevated temperature as a result of the great exotherm involved in this particular oxidation reaction. Moreover, the movement of the vehicle itself subjects the materials in the exhaust purification system to attritive forces and unless the active purifying material is highly resistant to attrition it disintegrates and the fines so produced tend to plug up and channel the flow of exhaust gases through the purifier. If the fines are sufficiently small they are carried out of the purifier with effluent exhaust and represent an economic loss. In any event, physical breakdown of exhaust-treating solids results in reduced efficiency of such substances, either by preventing uniform solid-vapor contact or by reducing the content of active solids present in the exhaust treating device.

Many forms of catalyst solids have been advanced for purifying exhaust vapors. For example, it has been suggested to provide the catalyst in the form of rigid structural forms, such as rods which are arranged in banks in a muffler. The rods consist, for example, of an inert porcelain support having active alumina and platinum deposited thereon. Such a material is expensive and its periodic replacement is not only expensive but requires considerable labor. The use of exhaust-treating solid in granular form appears to be more promising since granules are initially less costly to manufacture than rigid structural elements and are easier to introduce into and withdraw from the exhaust-purifying device. Normally such granules are maintained in a housing which doubles as an acoustic muffler, as mentioned above.

A serious problem is encountered in purifying exhaust gases of internal combustion engines using granular material. As a result of vibration to which they are subjected, the granules roll over each other and attrite. Moreover, many granular compositions suggested for treating engine exhaust have a strong tendency to break due to successive thermal expansion and contraction with the adverse effects above-noted.

One of the more promising granular exhaust-treating materials is an alumina-supported platinum oxidation catalyst. One signal disadvantage is the high cost of the catalyst. Another difficulty is that the catalyst is not thermally stable at elevated temperatures (e.g., 1500° F. or higher) which engine exhaust may reach in contact with the catalyst so that the catalyst is sintered and loses or is diminished in activity if exhaust reaches such temperatures. In addition to the above-mentioned difficulties, the platinum catalyst is very susceptible to "poisoning" by certain compounds which deposit on and impair the catalytic activity of the precious metal. One such "poison" is lead. Recently the use of so-called "leaded gasolines" has become widespread. Leaded gasolines are those to which has been added a small quantity of an organic lead compound, usually tetraethyl lead, for the purpose of increasing the octane rating of engine fuel. Invariably a halogenated compound, usually a mixture of ethylene dibromide and ethylene dichloride, is added with the lead compound to inhibit lead deposition on the walls of the engine cylinders. The exhaust gases from leaded gasoline are carried out in the exhaust gases in the form of finely divided solids, principally lead halides and lead-ammonium-halide complexes of varying vapor pressure. When a catalytic exhaust purifier containing a platinum catalyst is adapted to an engine operated on leaded fuel, the lead compounds tend to deposit and accumulate on the catalyst bed and impair the activity of the platinum catalyst. Although alumina-supported vanadium pentoxide catalysts have been reported to be more resistant to lead poisoning then platinum catalysts, such a catalyst is costly and has a limited span of utility before it operates well below optimum activity, probably as a result of reaction with lead compounds to form inactive lead vanadate compounds. Moreover, these granules leave much to be desired in the way of attrition resistance.

In summary, although the presence of smog irritants in the atmosphere has become a matter of nationwide concern, no simple inexpensive method of preventing or reducing the presence of smog-generating compounds has been found which has met general acceptance.

It is an object of the present invention to provide a novel method and system of treating exhaust fumes containing unburned fuel hydrocarbons.

A specific object of the invention is the provision of an effective, inexpensive system for curtailing the introduction into the atmosphere of those incomplete combustion products of fuels which contribute to the eventual production of smog irritants in the atmosphere.

A more particular object of the invention is the provision of such a system which is thermally stable even at the extremely elevated temperature which exhaust gases occasionally attain.

Another object of the invention is the provision of a system of the aforementioned character which is highly resistant to physical breakdown by attrition, even when used in association with the exhaust manifold of an internal combustion engine of a moving vehicle.

A further important object is the provision of an effective method of treating exhaust fumes of an internal combustion engine operating on leaded gas.

Further objects and features will be readily apparent from the following description.

The present invention contemplates the treatment of raw exhaust fumes containing incomplete fuel combustion products with particles of a solid aluminum silicate (hereafter set forth) prior to the passage of such fumes into the atmosphere so as to curtail the passage into the atmosphere of smog-producing matter normally present in the raw exhaust.

Briefly stated, in accordance with the present invention exhaust vapors containing unburned fuel hydrocarbons are passed at elevated temperature, prior to their discharge into the atmosphere, into direct contact with a vapor permeable mass of discrete particles, preferably spherical particles, of thermally desulfated, sulfuric acid-reacted kaolin clay. These particles, which will hereafter for convenience sake be referred to as "acid-activated kaolin clay," are produced in accordance with the method described in a copending U.S. patent application, Serial No. 490,128, filed February 23, 1955, now Patent No. 2,967,157. The method, in brief, involves reacting a substantial portion of the aluminum content of kaolin clay with sulfuric acid and, without leaching or washing out the resultant aluminum sulfate reaction product, desulfating the acid-reacted clay at elevated temperature. The acid-activated kaolin clay particles have essentially the same chemical composition as the kaolin clay from which they are prepared. Nevertheless, the particular acid treatment employed results in a profound change in the physical properties of the clay. For example, the acid-activated kaolin clay is significantly more resistant to attrition than kaolin clay or other aluminosilicates, natural and synthetic. The acid-activated clay has a much higher surface area than naturally occurring kaolin clay and there is strong indication that the orientation of at least some of silicon and aluminum is different in the two materials.

As a result of treatment of exhaust gases with this particular aluminum silicate, exhaust fumes which normally contain smog-producing constituents pass into the atmosphere with reduced content of such obnoxious matter. That the aluminum silicate exerts a profound effect upon the chemical composition of the exhaust fumes is evidenced by the changed, more pleasant odor of exhaust so treated.

The specific aluminum silicate employed in accordance with the present invention is less costly than precious metal impregnated catalysts and is considerably more resistant to shrinkage, sintering and fracture at elevated temperature than other aluminosilicate materials and is capable of being subjected to extreme variations of temperature and mechanical forces without fracture, disintegration or loss of active surface. Moreover, certain compounds sometimes present in exhaust, such as lead compounds, which quickly "poison" or deactivate platinum containing exhaust-treating compositions have a less adverse effect on the acid-activated kaolin. As a result, the granules within the scope of this invention have a relatively long effective span of usefulness and provide a simple, economical method of improving the character of exhaust vapors.

The specific mechanism by which the thermally desulfated, acid-activated kaolin clay operates on exhaust fumes to eliminate their smog-producing constituents is not presently known. Indeed, it is surprising to those familiar with the use of aluminosilicates as cracking catalysts in the petroleum industry that the subject aluminum silicate should have any observable effect whatsoever on automotive exhaust fumes, for example, since such fumes have little in common with the feedstock usually fed to catalytic cracking units employing aluminosilicates as cracking catalysts. To the best of my knowledge, aluminum silicate catalysts have not been employed in the past as oxidation catalysts. What has been ascertained is that the treatment of engine exhaust with the specific aluminum silicate results in a transformation of the character of the exhaust with little effect on the form and activity of the aluminum silicate, even at elevated temperatures which have a detrimental effect on familiar oxidation catalysts.

In accordance with the system of the present invention, acid-activated kaolin clay in the form of a vapor permeable mass of discrete granules fills a cartridge provided with inlet means to admit raw (unoxidized) exhaust and outlet means to permit exhaust gases to pass into the atmosphere after direct contact with the granules. The cartridge comprises a foraminous or perforated casing, the perforations in the casing being smaller than the granules which fill the casing. The cartridge may take any shape but is usually a rectangular box. The walls of the casing are perforated to assure uniform exhaust flow through the aluminum silicate mass. The casing may be made of thin gauge steel or high temperature alloy. The cartridge, or preferably a plurality of cartridges, is adapted to be mounted in a shell provided with inlet means to admit exhaust gases together with fresh air into the cartridge. A venturi inspirator system is used to admix air with raw exhaust prior to passage of exhaust into the shell. An outlet is provided in the shell for discharging into the atmosphere the exhaust vapors which have passed through the cartridges containing acid-activated kaolin; when automobile exhaust is treated, the exhaust will be discharged into the tail pipe.

The cartridge may be filled and refurnished with fresh acid-activated kaolin granules in situ (i.e., while the cartridge is mounted in the shell). Preferably, however, the cartridge is supplied as a sealed unit containing the acid-activated kaolin granules and the shell member is designed to receive and secure the cartridge in removable fashion so that the cartridge as a unit may be inserted into and removed from the shell. A suitable general arrangement of a replaceable cartridge-type exhaust purifier device is described in detail in U.S. Patent No. 2,853,367 to Karol et al. Although such a construction of cartridge and shell is suitable for the purposes of the present invention, it will be distinctly understood that other constructions, as are known or as will readily suggest themselves to those skilled in the art, may be used.

The aluminum silicate granules in the cartridge are in the form of particles as coarse as about 4/8 mesh or as fine as about 60/100 mesh, although particles somewhat coarser or finer may be employed, this depending on the factors influencing pressure drop in the system. Preferably, the granules are substantially uniform in size and have smooth contours (e.g., cylindrical pellets, spheres or spheroids) so as to insure uniform pressure drop throughout the cartridge containing the granules. The use of the acid-activated kaolin in the form of spheres is particularly preferred because of the exceptional hardness or resistance to attrition of the acid-activated kaolin in such form. The preparation of these spheres is described in a copending U.S. patent application, Serial No. 728,034, filed April 14, 1958. The granules substantially fill the cartridge in which they are housed, although they are not tightly packed in the cartridge since sufficient free space must be provided to insure that the exhaust gases may uniformly contact all granules without channeling or by-passing.

The system may be modified to provide for a plurality of aluminum silicate contact zones and such zones may be arranged for parallel or series flow and may be juxtaposed or separated as desired. Moreover, means other than the venturi device for conducting air into the cartridge may be employed. If desired, a baffle chamber or other means may be included in the system of the invention to entrap fine solids in the exhaust and prevent their passage into the aluminum silicate-containing cartridge.

In the operation of the exhaust purification system of the present invention, impure raw (unoxidized) gases from an engine manifold (or, if desired, directly from a cylinder in the case of a diesel engine) are diluted with fresh (secondary) air and the mixture passes through an inlet of the shell housing the cartridge into direct contact with the granules in the cartridge. The exhaust mixture is typically at a temperature within the range of about 300° F. to 1300° F. although the mixture may be cooler or considerably higher during various phases of engine operation. In practice the amount of secondary air has been sufficient to supply somewhat more oxygen than necessary to completely oxidize any oxidizable matter in the exhaust fumes. The granule-contacted exhaust vapors are then passed into the atmosphere.

Obviously, specific details of the purification system and method of the present invention will vary, among other things, with the engine size and type, space available for the purifier and available materials of construction.

While the method and system of the present invention have been described in what is presently believed to be its preferred form, it will be understood that the invention is not restricted to the specific details set forth above but encompasses changes, modifications and adaptations falling within the scope of the appended claims.

I claim:
1. A method of treating exhaust vapors containing unburned fuel hydrocarbons which comprises contacting air-diluted exhaust vapors with a vapor permeable mass of discrete particles of thermally desulfated, sulfuric acid-reacted kaolin clay at elevated temperature and passing exhaust thus treated into the atmosphere.

2. A method of treating exhaust vapors from an internal combustion engine comprising mixing said vapors with air, contacting the mixture at elevated temperature with a vapor permeable mass of discrete particles of thermally desulfated, sulfuric acid-reacted kaoline clay and passing exhaust thus treated into the atmosphere.

3. A method of treating exhaust vapors from an internal combustion engine which comprises mixing said vapors with air in amount such as to supply oxygen in excess of that necessary to oxidize completely oxidizable matter in said exhaust vapors, directly contacting said mixture at elevated temperature with a vapor permeable mass of discrete particles of thermally desulfated, sulfuric acid-reacted kaolin clay and passing the mixture thus treated into the atmosphere.

4. A method of treating exhaust vapors from an internal combustion engine which consists essentially in mixing said vapors with air in amount such as to supply oxygen in excess of that necessary to oxidize completely oxidizable matter in said exhaust vapors, directly contacting said mixture at elevated temperature with a vapor permeable mass of discrete particles of thermally desulfated, sulfuric acid-reacted kaolin clay and passing the mixture thus treated into the atmosphere.

5. A method of treating exhaust vapors from an internal combustion engine which consists essentially in mixing exhaust from an internal combustion engine, said exhaust containing unburned fuel hydrocarbons, with air in amount sufficient to supply oxygen in excess of that necessary to oxidize completely unburned fuel hydrocarbons in said exhaust, contacting said mixture at a temperature from about 300° F. to 1300° F. with a vapor permeable mass of discrete particles of thermally desulfated, sulfuric acid-reacted kaolin clay and passing the mixture thus treated into the atmosphere.

References Cited in the file of this patent

UNITED STATES PATENTS

| | | |
|---|---|---|
| 2,159,027 | Jalma et al. | May 23, 1939 |
| 2,853,367 | Karol et al. | Sept. 23, 1958 |
| 2,904,520 | Donovan et al. | Sept. 15, 1959 |